United States Patent [19]
Le Cren

[11] 3,857,488
[45] Dec. 31, 1974

[54] DYNAMIC WEIGHING APPARATUS

[76] Inventor: Roger Le Cren, 4, Avenue Odette, Nogent Sur Marne, France 94130

[22] Filed: Sept. 6, 1973

[21] Appl. No.: 394,662

[30] Foreign Application Priority Data
Sept. 7, 1972 France .................. 72.31713

[52] U.S. Cl. .................. 209/73, 209/74, 209/121, 177/211, 177/60
[51] Int. Cl. .................. B07c 5/16
[58] Field of Search ........ 209/121, 73, 74; 177/210, 177/211

[56] References Cited
UNITED STATES PATENTS

| | | | |
|---|---|---|---|
| 2,918,269 | 12/1959 | Williams, Jr. | 177/211 X |
| 2,954,969 | 10/1960 | McCullough et al. | 177/211 X |
| 3,063,635 | 11/1962 | Gordon | 177/210 X |
| 3,209,846 | 10/1965 | Karlen | 177/211 |
| 3,439,761 | 4/1969 | Laimins | 177/211 |
| 3,478,830 | 11/1969 | Levesque et al. | 177/210 X |
| 3,627,127 | 12/1971 | Whiteford | 209/121 |
| 3,656,337 | 4/1972 | McDonald | 177/210 X |

Primary Examiner—Allen N. Knowles
Attorney, Agent, or Firm—Walter F. Farley

[57] ABSTRACT

A dynamic weighing apparatus capable of measuring the respective static weights of moving objects. A weight transducer having a wide passband is used. The instantaneous signal supplied by the transducer is integrated while a speed-correction signal is generated by means of entry and exit detectors and an integrator. The division of the integrated signal by the speed-correction signal supplies the desired static weight in the form of a pulse duration. A device for classification, counting and sorting by weight categories is advantageously associated with the dynamic weighing device.

The rates of weighing and classification may attain several tens per second.

17 Claims, 8 Drawing Figures 3,857,488

DYNAMIC WEIGHING APPARATUS

BACKGROUND OF THE INVENTION

The invention relates to dynamic weighing, that is to say, techniques for weighing articles in movement. More precisely, it concerns a system of devices for weighing articles moving past in rapid succession. It also concerns auxiliary devices for handling articles before and after weighing, devices for classifying, sorting and weighttotalling of the articles as a function of their weight categories.

The scope of application of the invention covers widely differing industries, from food industries (biscuit factories, salting and curing factories), poultry farming, oyster breeding or pisciculture industries (killed pullets or eggs, oysters or clams, live trout) to the pharmaceutical industries (weighing and sorting of tablets), etc.

Hitherto, dynamic weighing processes and devices have used mechanical or electromechanical apparatus, e.g. automatic balances, but the speeds and accuracies thus obtained have generally been insufficient for the needs of the industry concerned. More elaborate arrangements making use of electronics have, however, been developed for solving certain special problems.

Thus, in U.S. Pat. No. 3,276,525 issued in 1966 to G. Cass for "Method and apparatus for dynamically weighing articles in motion" an apparatus is described which is more particularly intended for weighing railway waggons. Such apparatus comprises substantially a weighbridge provided with strain gauges connected into a bridge and an electronic signal processing system. In such dynamic weighing, it is known that the most difficult problem to solve is that of freeing useful signals from random parasitic signals due to vibrations, oscillations or vertical movements of the load, which are constantly superimposed on the signals representing the desired static weight. In the case of the Cass patent, the solution adopted is to apply the analogue signal supplied by the gauge bridge to a low-pass filter and then to integrate it during a time interval determined from the moment at which the waggon is supported entirely by the weighbridge. For compensating variations in supply voltage of the gauge bridge, a signal derived from this voltage is also integrated during the said predetermined time interval and the two output signals respectively supplied by the two integrators are divided by each other in a numerical division circuit, to supply a numerical measure of the static weight sought.

Weighing of the waggons in motion thus effected is accurate (about 1 percent), but nevertheless relatively slow since, according to Cass, about three seconds are necessary for carrying it out. In addition, the electronic solution if it is applied to the weighing of small objects rapidly passing leads to the use of relatively complicated techniques. Furthermore, in the case of objects of a given type whose length and/or speed of advance may vary by considerable amounts (from one to double, for example), the technique described by Cass cannot be applied. In fact, if the integration interval provided by G. Cass is fixed at a definite interval, it is at once apparent that if the rate of advance of the load increases sufficiently so that the time of dwell of the load completely engaged on the dynamometer device becomes less than that of the integration interval, a completely erroneous result is obtained. In addition, depending on the length of the object, the duration of the said total engagement is variable and may be extremely short, since it is theoretically zero for an object in motion whose length is exactly equal to that of the weighing member. It is also necessary to add to this that the use of a low-pass filter capable of reducing the amplitude of the parasitic signals causes a response time to appear and introduce a delay in information transmission which becomes inacceptable when rates of forty or 50 weighings per second are desired for certain special applications (particularly the sorting of tablets in the pharmaceutical industry).

Generally, throughout the following description, by rapid weighing is to be understood, for example, weighings of 500 grams carried out five times per second or weighings of one gram carried out 50 times per second, the rate of weighing being of course an inverse function of the weight of the loads. Consequently, a first object of the present invention concerns the provision of a dynamic weighing device which is simple, capable of supplying very rapidly and with good accuracy (about 1 percent) an output signal representing the static weight of an article in action even if the length and/or speed of advance of this article may vary in considerable proportions.

SUMMARY OF THE INVENTION

According to the invention, a dynamic weighing device for articles of comparable weight and bulk is characterised by comprising:
    handling means causing the said articles to advance in translation, separated from one another by a predetermined minimum distance,
    a weight transducer having a pass band adapted to the desired rate of weighing, a range of measurement adapted to the weights of the said articles and a weighing platform whose dimension in the direction of advance of the articles is at least equal to the maximum dimension of the article in the said direction,
    integrating means for integrating a signal derived linearly from the signal supplied by the said transducer during the entire period of passage of an article on the platform,
    means for generating a transit-time correction signal inversely proportional to the mean speed of crossing the platform by the said article, and
    means for dividing the signal generated by the said integration means by the said correction signal and for thus generating a measurement signal representing the static weight of the article.

During the passage in translation (at approximately constant speed) of the article on the platform, the signal supplied by the weight transducer has front and rear flank edges of identical shape but opposite directions, these edges being moreover generally non-linear. The edges are separated from one another by a level stretch of non-zero length, varying with the speed of passage of the article in inverse relationship and with its length in linear relationship having a negative coefficient. Under these conditions, after integration in the time of a derived signal, which is an analogue signal amplified or converted in frequency or a digital signal of the instantaneous signal supplied by the transducer, there is obtained a signal representative of the product of the static weight of the article multiplied by the duration of the time interval separating the initial entry and exit instants of the said article on the platform. It is now clear that the result of the division of the aforesaid integrated signal by a transit-time correction signal of inverse function of the mean speed of advance of the articles represents the static weight of the article and, in addition, independent of its speed of displacement, its length and the parasitic signals superimposed on the signal generated by the transducer.

It will be noted as from now that by articles of comparable bulk and weight are understood articles of which the relation of the extreme homologous dimensions is less than about 1.5 and the ratio of the maximum and minimum weights is less than about 3.0

A second object of the present invention concerns a handling device for causing the articles received in disorder to pass one by one on to the platform of a weight transducer for permitting the use of the aforesaid dynamic weighing device in very widely differing industries.

According to the invention, an aligning and separating device for causing articles of the same nature and comparable dimensions received in disorder to pass one by one, separated from one another by the predetermined minimum distance, so that they can be subsequently weighed one by one, is characterised by comprising:
  at least two means of transport of a type adapted to the nature of the said articles, arranged in sequence one after the other, the speed of advance of the downstream means of transport being several times higher than the speed of the upstream means of transport,
  and guiding means associated with the upstream means of transport and constituting a constricted passage, the width of which is determined by a particular dimension of the articles caused to pass.

Due to this arrangement, the co-operation of the means of transport situated upstream in the device and of the guiding means associated with it causes the articles received in disorder to align themselves edge to edge one behind the other. Consequently, due to the downstream means of transport advancing at a speed several times higher than that of the upstream means of transport, each article arriving at this more rapid means of transport is accelerated, while the article immediately following it still advances at constant speed, such that sufficient free space is produced between two successive articles at the exit of the separation device according to the invention.

The types of the means of transport and guiding used will differ according to the nature of the articles to be aligned. For live fish or crustaceans, the said means will be water streams circulating in channels of closed section adapted to the shape of the fish or crustaceans to be weighed and of relatively considerable length with respect to them. For inert objects of irregular shape (oysters, killed pullets, cut-up cheese) these means will be conveyor belts associated with guide walls. For articles of small size and regular shape (pharmaceutical tables), these means will be ascending vibrating ramps, at least for the means of transport situated upstream in the device. Of course, a combination of different active and passive means of transport is to be considered in most cases (descending slipways fro connecting together two active means of transport, for example). Other means of transport, such as currents of compressed air (in the case of light and voluminous articles) may also be suitable.

A third object of the invention concerns a weight transducer capable of weighing at a rapid rate articles of small or average weight (from several decigrams to several kilograms), the use of which provides a definite contribution to the embodiment of a rapid, dynamic weighing device according to the invention.

According to the invention, a weight transducer is adapted to weigh articles of comparable weight with good accuracy and at a high rate. The transducer is of the kind comprising a Roberval half-mechanism equipped with a vibration damping device, and is normally formed of two parallel rigid arms of the same length, hinged respectively at two fixed points vertically aligned on a support and in addition respectively hinged at two movable points arranged on a connecting rod integral with a weighing platform and in general with the said damping device. In the said Roberval half-mechanism according to the invention, at least one of the fixed hinges and at least part of the arm integral therewith are replaced by a deflection blade on the one hand fixed in the said support, and on the other hand fixed rigidly to the remaining part of the said arm. The said blade is provided with strain gauges connected in a Wheatstone bridge and arranged on the said blade and in the said bridge in such a manner that the measuring signal supplied by the said bridge is, in practice, independent of the tensile, compressive or torsional stresses applied to the said blade. The stiffness of the blade is selected according to the maximum bending moment exerted by the articles to be weighed. The pass-band of the said transducer with an article present on the platform is selected as a function of the said rate and accuracy.

Due to this arrangement, the pass-band of the weight transducer may without particular difficulties be adapted to the desired rate. According to the desired pass-bands, eddy current or dash pot type damping devices will be used. Depending on the loads to be weighed, the blades and gauges will be of different types. In the case of loads greater than about 10 grams and less than about ten kilograms, the blades will be made of resilient material having stable characterisation of suitable thickness, depending on the load, and the gauges will be adhesively secured semiconductor rods. In the case of loads less than about ten grams but greater than one decigram, the gauges will be integrated directly, by gaseous diffusion, in the flexion blade and the latter will be formed of a silicon single crystal of suitable thickness such as several hundredths of a millimetre.

A fourth object of the present invention concerns a particular embodiment of a dynamic weighing device.

According to the invention weighing device for an article traversing it in translation, of the kind comprising a wide pass-band transducer equipped with a weighing platform provided with guide means adapted to the nature of the articles, and a system of processing signals, including a first and second analogue integrator circuit, is characterised by comprising in addition:
  means for applying to the input of the first integrator circuit the signal supplied by the said transducer during the entire period of passage of the article on the said platform;
  means for applying to the input of the second integrator circuit a signal derived from the supply source of the said transducer during a time interval whose commencement and end are determined respectively by the instants of arrival of the article in front of a first and second presence detector respectively arranged at the input and output of the said platform, and thus generating at the out of the second integrator circuit, at the end of the said interval, a transit-time correction signal;

means for applying at the end of the said interval the said correction signal to the input of the first integrator for discharging the latter at a discharge rate proportional to the said correction signal;

measuring means receiving a triggering pulse at the instant of application of the correction signal to the input of the first integrator circuit, then a blocking pulse at the instant when a comparator circuit detects that the amplitude of the output signal of the first integrator circuit regains a predetermined inoperative level, the said measuring means being adapted to generate analogue and/or digital signals representative of the static weight of the article which has just passed along the platform.

Due to this arrangement, there is first of all obtained at the output of the first integrator a signal proportional to the integral with time of the instantaneous value signal supplied by the weight transducer, i.e. to the product of the static weight of the article multiplied by the time of transit separating the entry and exit instants of the article on the transducer platform. A signal proportional to the transit time is then obtained at the output of the second integrator. The time of discharge of the first integrator by a current proportional to the output signal of the second integrator is proportional to the quotient of the two signals. Such a quotient generates a pulse of duration independent simultaneously of the feed of the transducer and the length and speed of the article and representative of the desired static weight of the article alone. Due to their integration and then their division by the transit time, the parasitic signals inevitably superimposed on the signal supplied by the transducer introduce a very limited error. The duration of the output pulse thus obtained in analogue information which is easily converted to digital information by means of a time pulse generator, a gate and a pulse counter. Depending on the nature of the loads to be weighed, the presence detectors will be, for example, photoelectric, electromagnetic, electrical short-circuit or capacitive-variation detectors.

A fifth object of the present invention concerns a device for classifying as a function of their weight the articles weighed by the preceding device.

According to the invention, a device for classifying articles in N weight categories is characterised in that it comprises a number (N−1) of monostable circuits, whose periods of operation, adjustable as a function of the upper threshold of the (N−1) lower categories, increase as a function of their rank, and a number N of logical AND circuits. The said monostable circuits are all triggered by the leading front of the output signal supplied by the said comparator circuit, the direct output signal of each monostable circuit being supplied to the input of the AND circuit of the same rank as it, the inverse output signal of a monostable circuit of given rank being applied to the input of the logical AND circuit of the next higher rank.

Due to such a classification circuit, the pulses appearing at the output of the AND circuit of rank $(n+1)$ indicate that the weight of the article weighed at that instant is included between a low borderline determined by the duration of operation of the monostable circuit of rank $n$, and a high borderline determined by the duration of operation of the monostable circuit of rank $(n+1)$. By counting respectively the classification pulses corresponding to the various weight categories, the number of articles falling into each of the said categories can be obtained.

A sixth object of the present invention concerns a sorting control device and a sorting device intended to be associated with the classification device described in the foregoing. In practice, the sorting of articles into four weight categories is found to be the most usual industrially (too low, low but good, high but good, too high). In fact, any sorting into a higher number of categories (generally $2^n$) is deduced directly therefrom.

According to the invention, a device for controlling the sorting of articles into four weight categories and intended to generate three binary sorting control signals X, Y and Z is characterised by comprising:

three bistable circuits producing the said signals X, Y and Z, terminals for putting into the active state bistable circuits supplying the signals Y and Z receiving respectively the classification pulses supplied by the logical AND circuits or rank 2 and 4, the terminal for putting into the active state the bistable circuit supplying the signal X, receiving the output pulses of a logical OR gate, to the input of which are applied the classification pulses supplied by the logical AND circuits of rank 3 and 4, terminals for resetting in the passive state the three bistable circuits receiving in parallel a pulse derived from that generated by the presence detector provided at the exit of the transducer platform.

According to the invention, a device for sorting articles into four categories and intended to receive the three binary signals X, Y and Z supplied by the preceding sorting control device is characterised by comprising:

a means of transport adapted to the nature of the said articles, arranged at the output of the platform of the said transducer and advancing at a speed at least equal to the speed of movement of the articles on the said platform, a first switching means adapted to cause an article to be led by the said transport means towards a first or second pair of discharge channels as a function of the binary signal X, a second and a third switching means arranged downstream of the first switching means at the head of the said two pairs of channels respectively, the second and third switching means being repsectively adapted as a function of the binary signals Y and Z to cause an article to be led by the second transport means towards a first and second discharge channel of the said pairs of channels.

In the same way as for the article aligning and separating device described in the foregoing, the transport means used will be adapted to to the nature of the articles, i.e. they will be more particularly belts or water streams. The same will apply to the switching means which, depending on their use, will be simple flaps or compressed air pulses.

A seventh and last object of the present invention concerns a device for totalling the weight according to the categories of articles, the said device being intended to be associated with the dynamic weighing and classifying devices described in the foregoing.

According to the invention, a device for totalling according to categories the weights of articles respectively classified in N categories is characterized by comprising N transfer members, respectively associated with N totalling counters. The said transfer members, rendered respectively operative by the N classification pulses, operate in such a manner that the digital signal supplied by the said dynamic weighing device is returned to zero after having been transferred and counted in a given counter selected by a particular classification pulse. Due to this device, the total weights of each weight category are calculated immediately after each weighing and classification, while the dynamic weighing device is returned to a condition for carrying out a fresh weighing operation.

The features abd advantages of the invention will appear more particularly from the following description given solely as non-restrictive example with reference to the accompanying drawings.

Figure 1:
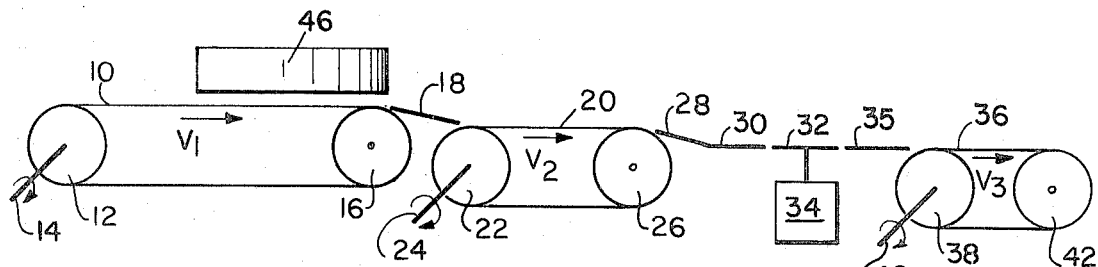
FIGS. 1 and 2 show diagrammatically in elevation and plan an automatic weighing and sorting machine adapted according to the invention use with oysters.

According to FIG. 1, a first relatively long and wide conveyor belt 10 is driven at a speed $V_1$ (for example 30 cm/s) by a roller 12 fast on a driving shaft 14, and auxiliary roller 16 being associated with it. The belt 10 is followed by a descending ramp 18 terminating in a second, relatively short and narrow conveyor belt 20, driven at a speed $V_2$ (for example 1 m/s) by a roller 22 fast on a driving shaft 24, sn auxiliary roller 26 being associated with it. The belt 20 is followed by a descending ramp 28, terminating in a landing 30. Located in the plane of the landing 30 is the substantially horizontal platform 32 of a weight transducer 34 followed by a discharge landing 35 of the same length. The landing 35 is followed by a relatively wide third conveyor belt 36, driven at the speed $V_3$ (for example 2 m/s) by a roller 38 fast on a driving shaft 40, a roller 42 being associated with it.

Figure 2:
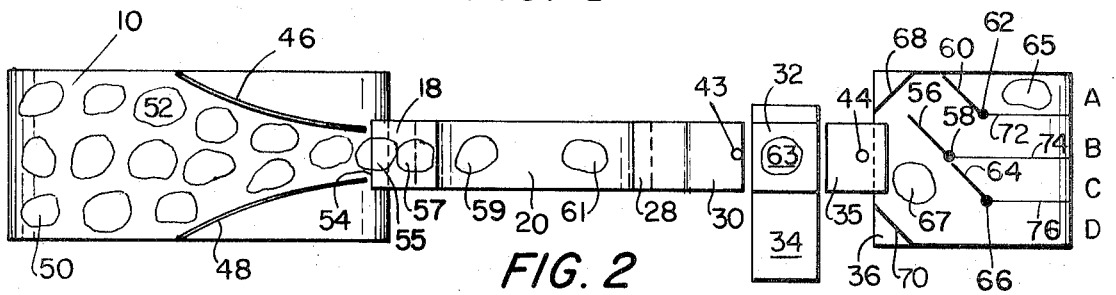

According to FIG. 2, showing diagrammatically a plan of the device of FIG. 1, two curved partitions 46 and 48 are arranged convergently above the downstream end of belt 10 (they are secured to two gantries, not shown). A workman has spread on belt 10 oysters such as 50, 52, which are to be aligned, separated, weighed, sorted and counted. The width of the constricted passage 54 formed by the convergence of partitions 46 and 48 is slightly larger than the maximum dimension of the oysters of the batch to be treated.

Slightly upstream of the platform 32 and a little beyond the centre line oflanding 35 (in fact downstream of the exit of the platform at a distance approximately equal to the "diameter" of an oyster of average size) at not very critical positions, are two photoelectric presence detectors 43 and 44. The latter comprise first of all two light sources arranged above the plane of the platform and emitting two narrow beams passing almost vertically through a slot (or window) such as 45 (see FIG. 4), formed in the landings 30–35. They also comprise two photoelectric cells receiving the aforesaid beams, located below the platform and associated, as is known, with amplifiers and differentiation circuits (not shown) for supplying an output pulse at the moment the said beams are cut off.

Associated with the discharge belt 36 are external guard partitions 68 and 70 and separation partitions 72, 74 and 76. The central partition 74 comprises at its upstream end a switching flap 56 driven by a motor shaft 58 adapted to assume two positions in response to a binary signal X applied to a drive element, not shown (electromagnet). Likewise, the partitions 72 and 76 comprise respectively two switching flaps 60 and 64, driven by drive shafts 62 and 66 responding respectively to binary orders Y and Z applied to their associated drive elements. On the descending ramp 18 are shown oysters 55, 57 aligned edge to edge, on the second conveyor belt 20 oysters 59 and 61 clearly separated from one another, on the platform 32 a single oyster 63 and on the discharge belt 36 two sorted oysters 65 and 67.

Figure 3A:
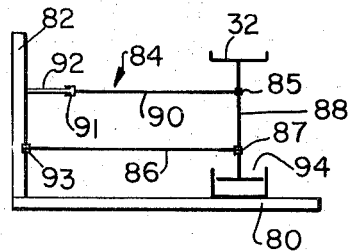
FIGS. 3a and 3b are a diagrammatic side view and plan of a wide pass-band weight transducer more particularly adapted for putting the invention into effect.

FIG. 3a shows diagrammatically in elevation a wide pass-band weight transducer. It comprises essentially a Roberval half-mechanism modified according to the invention: a horizontal base 80, a vertical support 82, two equal and parallel arms 84 and 86 respectively hinged at 85 and 87 to a connecting rod 88, the upper arm comprising a beam 90 rigidly associated at 91 with a deflection blade 92 firmly fixed in the support 82, while the lower arm 86 is hinged to a fixed point 93 integral with the support 82. In its upper part, the connecting rod 88 comprises the platform 32 and in its lower part a vibration damping device 94. According to the necessary pass band, this device will be an air and piston dash pot as shown or an eddy current brake (copper plate in the air-gap of a magnet).

Figure 3B:
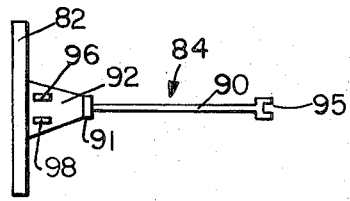
Figure 7:
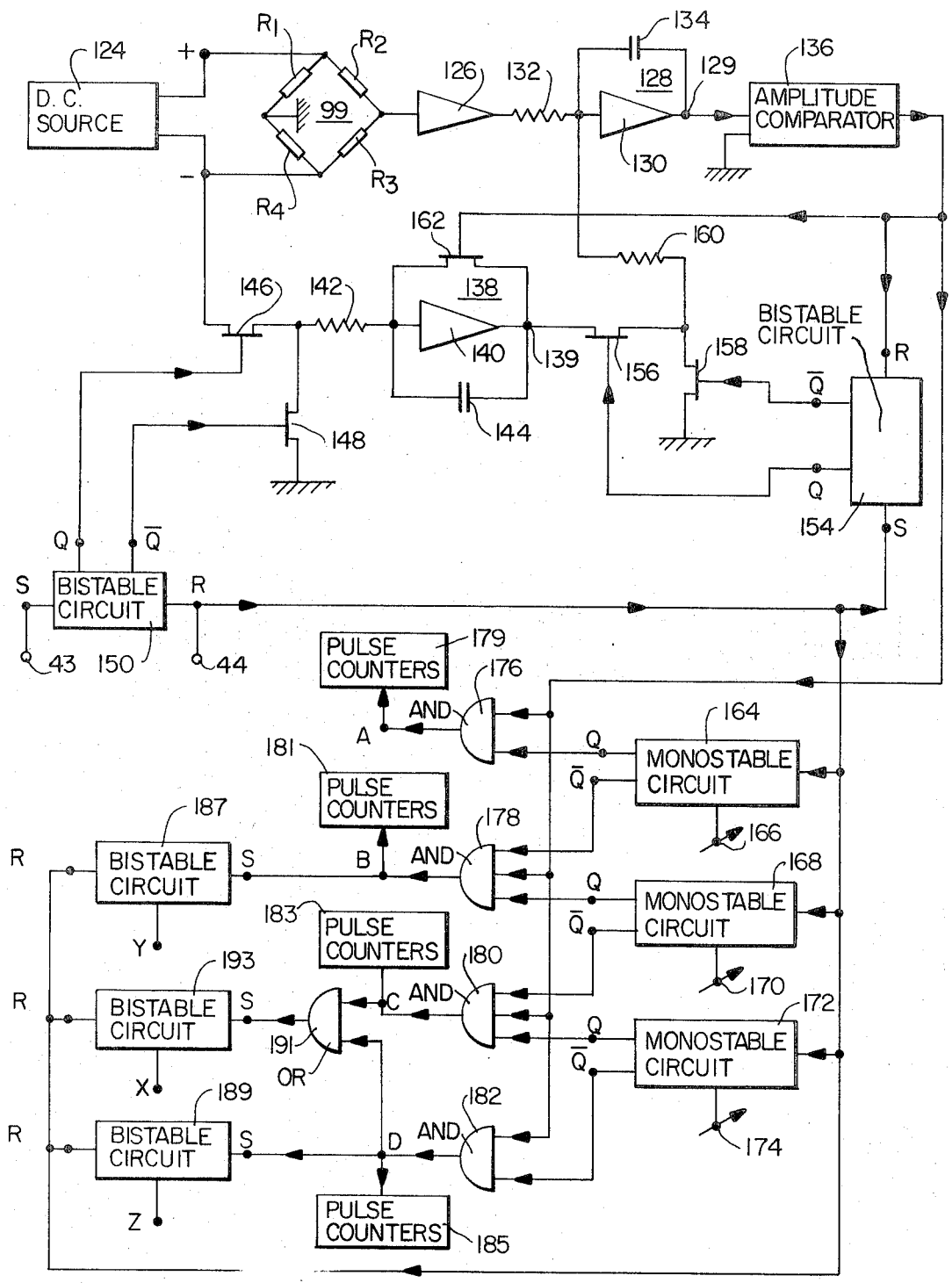
FIG. 7 shows diagrammatically dynamic weighing, classifying, counting and sorting-control devices according to the invention.

FIG. 3b shows diagrammatically in plan the upper arm 84. The deflection blade 92 is of the trapezoidal type. This shape has the advantage of permitting adjustment of the rigidity of the blade by gradually making it more pointed. Furthermore, it permits the inertia of the connection 91 between the blade 92 and the beam 90 to be reduced. The free end of beam 90 comprises a fork 95 participating in the hinge 85. It will be noted that such a hinge 85, while being like those provided at 87 and 93, will be constructed in accordance with the loads to be weighed, pins and ball bearings for the largest loads and conical pivots and sockets or taut wires having slight torsional stiffness for the smallest loads. Adhesively secured in known manner to the upper face of blade 92 are two strain gauges 96 and 98, preferably made of semiconductor material for higher sensitivity. As will be seen, these gauges of valves $R_1$ and $R_3$ are arranged symmetrically with respect to the axis of the beam 90 and blade 92, in close proximity to the fixing line. On the lower face of the blade, two other gauges identical to the preceding gauges, of values $R_2$ and $R_4$, are arranged in the same manner symmetrically with respect to the plane of the blade. The gauges $R_1$ and $R_3$ of the upper face of the blade are placed in two opposite branches of the Wheatstone bridge 99, and the two gauges $R_2$ and $R_4$ are placed in the other two opposite branches, as shown in FIG. 7.

Figure 4:
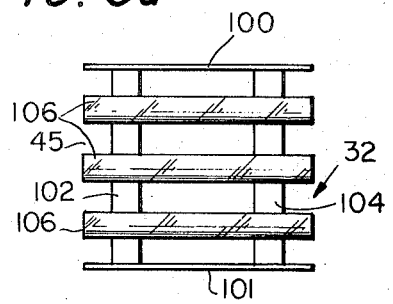
FIG. 4 is a diagrammatic plan view of a weighing platform more particularly adapted for carrying the invention into effect in the case of articles of irregular shape.

According to FIGS. 4, the weighing platform 32 advantageously used for weighing oysters or any articles of irregular shape consists of a light rigid structure formed by two flat longitudinal members 100 and 101 forming flanges, and two cross-members 102 and 104. The cross-members are provided with notches, not shown, in which are adhesively secured cylindrical rods, for example of hollow glass, such as 106, arranged longitudinally and spaced apart by a distance comparable with their diameter. The ramp 28 and the landings 30 and 35 have a structure similar to that of platform 32, and the rods forming them are arranged in line with the rods of platform 32.

Figure 5:
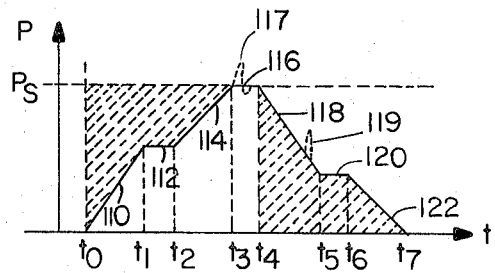
FIG. 5 shows a possible output signal supplied by the transducer of FIG. 3.

FIG. 5 shows an example of the evolution of the measuring signal generated by the bridge of strain gauges 99 associated with the deflection blade 92. Such a signal is generated when the article to be weighed comprises two distinct contact zones aligned in the direction of movement of the article. In this case, as the article (oyster in the present case) moves over the platform 32, an increasing signal, composed of three successive sections, makes its appearance. First of all, a relatively steep slope 110, which commences at $t_o$ and terminates at the instant $t_1$, when the whole of the second contact zone is engaged on the platform. Then a step 112 which commences at $t_1$ and terminates at the instant $t_2$ when the second contact zone is engaged on the platform. Finally, a slope 114, also steep, which commences at $t_2$ and terminates at $t_3$ when the whole of the second contact zone is engaged on the platform. A step 116 then appears, which terminates at the instant $t_4$, in which the first contact zone commences to leave the platform to engage the discharge landing 35.

When the article commences to leave the platform 32, due to the fact that this article $a$ in practice retains its initial velocity and only moves in translation along the platform (guide bars for oysters, weighing tubes for trout), the signal undergoes an inverse evolution identical with that which it had when the article commenced to pass on to the platform. Under such conditions, the decreasing signal reproduces identically but conversely the increasing signal described in the foregoing. — a straight descending slope 118 passing from $t_4$ to $t_5$, a step 120 passing from $t_5$ to $t_6$ of the same duration of the step (112) passing from $t_1$ to $t_2$, then again a fresh steep slope 122 passing from $t_6$ to $t_7$, identical but opposite in direction to that (114) passing from $t_3$ to $t_4$; it is equal to the length L of the platform divided by the speed V of movement of the oyster. A dashed line above the step 116 and above the slope 118 shows two parasitic signals 117 – 119, such as those generated by the shock of the front edge of a contact zone of the oyster and some fragment adhering to a rod of the platform 32, then of the shock due to the falling back of the rear edge of the same zone onto the platform.

Figure 6:
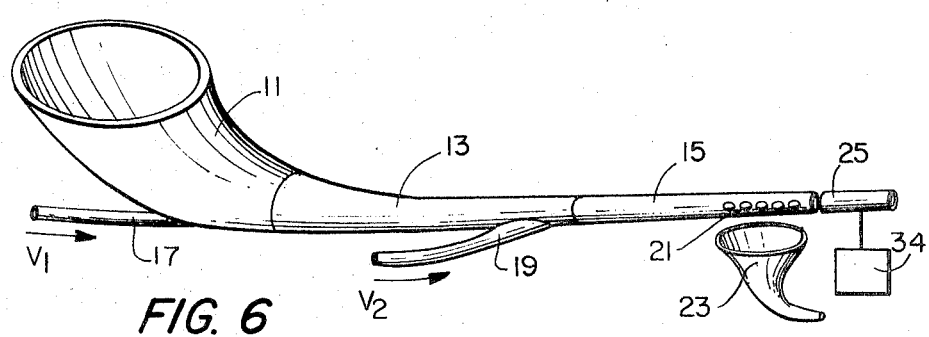
FIG. 6 shows diagrammatically handling devices for live fish.

According to FIG. 6, showing handling means for use with live fish, a funnel with flared edges is connected to a first and second pipe 13 and 15, the section of pipe 13 diminishing gradually in the upstream to downstream direction. The final section of pipe 13 and that of pipe 15 are determined in shape and size by those of the maximum section of the fish of the batch to be weighed.

A first stream of water of velocity $V_1$ is applied to the tube 17 and a second stream of velocity $V_2$ is applied to the tube 19. Before arriving at the downstream end of pipe 15, the conveying water is drained off through perforations 21 into a collector 23. The weighing tube 25 follows the pipe 15.

The operation of such a device being on the whole identical with that of the device of FIGS. 1 and 2, it will not be explained more particularly in the following.

FIG. 7 shows diagrammatically an electronic treatment system for elaborating the signals of static weight measurement, classification and sorting into four categories, from transitory signals, such as those of FIG. 5 supplied by the weight transducer when an article to be weighed moves along it in translation.

According to FIG. 7, the bridge 99 of gauges $R_1$ to $R_4$ supplied by a D.C. source 124 (12 to 18 volts, for example) is connected to the input of a low-drift preamplifier 126. The latter is followed by a first integrator 128 comprising an operational amplifier 130, an input resistor 132 and a feed-back capacitor 134. The integrator 128 is followed by a binary output amplitude comparator 136, whose other input is earthed. A second integrator 138, comprising an operational amplifier 140, input resistor 142 and feedback capacitor 144 has its input connected to the negative supply terminal of the source 124 by a first semiconductor switch, which is a field effect transistor, 146 and to earth by a second semiconductor switch 148. These two switches are controlled respectively by the direct and inverse outputs Q and $\bar{Q}$ of a bistable trigger circuit 150, whose terminals in the passive and active stage are respectively connected to photoelectric detectors 43 and 44 of the entry and exit of articles on the platform 32. The exit detector 44 is furthermore connected to the active state control terminal S of a bistable measuring trigger circuit 154.

The terminal R controlling the passive state of the trigger circuit 154 is connected to the output of the amplitude comparator 136. The output of the second integrator 138 is connected to the input of the first integrator 128 across a resistor 160 by means of a semiconductor switch 156 and to ground through a semiconductor switch 158, these switches being respectively controlled by the direct and inverse outputs Q and $\bar{Q}$ of the trigger circuit 154. A switch 162 provided at the terminals of the capacitor 144 is furthermore closed for a short time by the output pulse supplied by the amplitude comparator 136.

The pulse supplied by the detector 44 is moreover simultaneously applied to the triggering terminals of three monostable circuits of adjustable operational period 164, 168 and 172. These three circuits determine the sorting thresholds of the weighed articles. For this purpose, they possess respectively three duration control buttons 166, 170 and 174. The output pulse supplied by the amplitude comparator 136 is simultaneously applied to four logical AND circuits 176, 178, 180 and 182, which respectively supply four classification pulses A, B, C and D. The AND circuit 176 supplying the pulse A receives the direct output of the monostable trigger circuit 164. The AND circuit 178 supplying the pulse B receives the inverse output of the trigger circuit 164 and the direct output of the trigger sircuit 168. The AND circuit 180 supplying the pulse C receives the inverse output of the trigger circuit 168 and the direct output of the trigger circuit 172. The AND circuit 182 supplying the pulse D receives in addition the inverse signal of the trigger circuit 172.

The classification pulses A, B, C and D are respectively applied to four electromechanical pulse counters 179, 181, 183 and 185. These counters are preferably of the adjustable precount type. They supply an output signal and then return to zero when the number of pulses counted is equal to the number set in precount. This output signal may be advantageously used for operating an alarm (acoustic or luminous) or for blocking by means of a flap (not shown) the corresponding exit channel A, B, C or D (see FIG. 2).

In addition, the pulses B and D are respectively applied to the active state control terminal S of two bistable trigger circuits 187 and 189, whose passive state control terminals are connected to the exit detector 44. These two trigger circuits supply respectively the binary signals Y and Z controlling the power stages of the drive devices (electromagnets) fast with the shafts 62 and 66 of the switching flaps 60 and 64 (see FIG. 2). Furthermore, pulses C and D are applied to an OR circuit 191 whose output is connected to the active state control terminal of the bistable trigger circuit 193, supplying the binary signal X controlling the power stage of the drive device connected to shaft 58 of switching flap 56, the other input terminal of circuit 193 being connected to detector 44.

Figure 8:
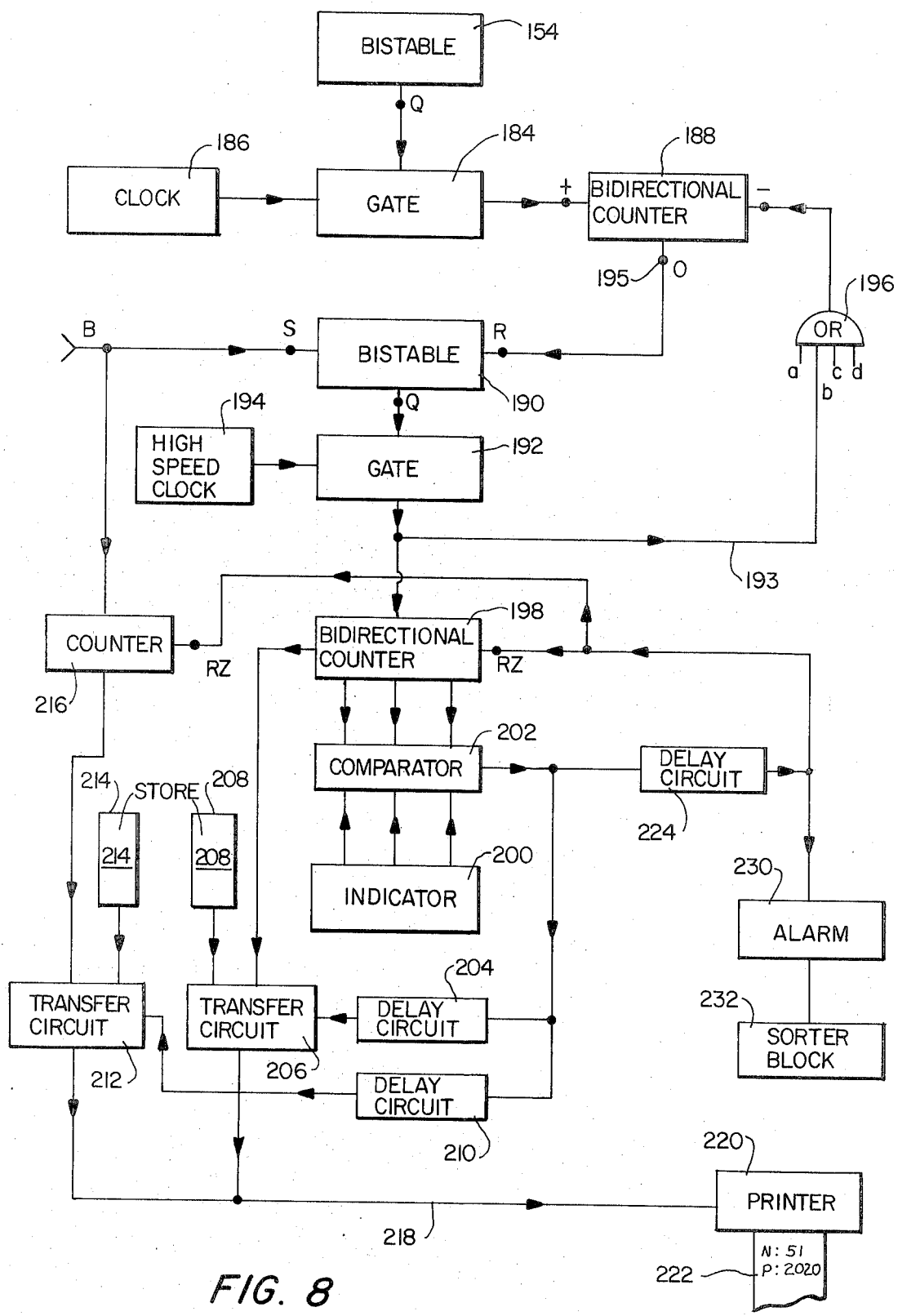
FIG. 8 shows diagrammatically a weight-totalling and resultprinting device according to the invention.

FIG. 8 shows by way of example a special processing arrangement co-operating the preceding arrangement and intended to supply signals for controlling the printing of information corresponding to a box of oysters ready for despatch — number and total net weight.

According to FIG. 8, the direct output Q of the measuring bistable trigger circuit 154 of the system according to FIG. 7 is applied to the input of a gate 184 arranged between a clock 186 and a pulse counter-deducter 188 comprising a counting input terminal (+) and a deducting input terminal (−). In addition, the counter-deductor 188 comprises a zero state terminal 195 at which the output pulse appears when the counter-deducter 188 assumes the zero state. Furthermore, the classification pulse B supplied by the system according to FIG. 7 is applied to the active-state control terminal S of a bistable trigger circuit 190, the passive-state return terminal R of the latter being connected to the zero state terminal 195 of the counter-deducter 188. The direct output of the trigger circuit 190 is connected to a gate 192 arranged between a high-speed clock 194 and a pulse counter 198, the output of gate 192 being furthermore connected to ($b$), one of the four inputs of an OR gate 196, whose output is connected to the deducting input (−) of the counter-deducter 188. Three other groups of circuits (not shown) identical with the circuits 190 and 192 are associated with the high-speed clock 194 (or with identical clocks) for supplying the three other inputs ($a$), ($c$) and ($d$) of the OR gate 196 when classification pulses A, C and D appear in the system of FIG. 7.

Associated with the counter-deducter 198 are a despatch-weight indicating device 200, preferably of the ink-printing type, having binary coded decimal outputs and a logical comparator circuit adapted to supply a pulse when the states of the counter 198 and printing indicator 200 are identical. The output of comparator 202 is connected via a first delay circuit 204 to the control terminal of a transfer circuit 206 associated with a pre-wired store 208 comprising the command code for printing the word "WEIGHT" or an equivalent sign, circuit 206 being connected upstream to the decimal outputs of counter 198. The output of comparator 202 is in addition connected via a second delay circuit 210 to the control terminal of a transfer circuit 212 associated with a pre-wired store 214 containing the printing command code of the word NUMBER or an equivalent sign, the circuit 212 being connected upstream to a pulse counter 216 having decimal outputs and receiving the classification pulses B. The outputs of the transfer circuits 206 and 212 are connected by a multiple connection 218 to the inputs of a printer 220 providing a printed tape 222. The output of comparator 202 in addition is connected through a third delay circuit 224, whose output is connected to the zero resetting terminal of counters 198 and 216 and to an alarm command circuit 230 (bell or lamp signal) associated with device 232 blocking the exit of the sorter allocated to category B.

Three systems of circuits, identical with the preceding systems, are provided for treating the weighing signals as a function of the classification signals A, C and D, a single printer 220 being provided of course for the four categories.

When a basket of oysters is emptied, then spread by a workman along the conveyor belt 10 upstream of the convergent partitions 46 and 48, the oysters are gradually returned towards the centre of the belt. They finally leave (such as 55 and 57) aligned edge to edge through the narrow passage 54. They then slide on the descending ramp 18 and retain approximately their previous speed $V_1$ (30 cm/s). On arrival on the belt 20, which moves forward at a speed $V_2$ of the order of 1 m/s, the oyster 57 is greatly accelerated, while the oyster 55 continues to descend at approximately constant speed. Under these conditions, a considerable gap equal to more than twice their longitudinal dimension appears between two consecutive oysters and is retained along the entire belt 20. The ramp 28 and the landing 30, which are of openwork construction like the weighing platform 32 shown in FIG. 4, therefore receive one by one the oysters having a speed of translation $V_2$. Due to the construction adapted for the ramp 28, landings 30 and 35 and platform 32 (glass rods), the oysters slide under excellent conditions. In fact, since the glass rods have a low coefficient of friction, constancy of the forward speed of the oysters is ensured. In addition, these rods maintain the oysters in their movement of translation, since they act like real guide rails, preventing the oysters from being subjected to the slightest rotation during their travel along the weighing platform.

As has been rapidly indicated in the foregoing, these two points are very important for the correct functioning of the dynamic weighing process and device of the invention. In fact, referring to FIG. 5, it will be seen that the ascending and descending flanks of the signal supplied by the weight transducer are identical (but opposite in sense) in the general case in which they are not linear, only on condition that the article to be weighed enters and leaves at the same speed and with the same attitude, and therefore during its passage along the platform is not subject to any braking, acceleration or rotation about a vertical axis. With a horizontal weighing platform having minimum friction and guide rods as shown in FIG. 4 in the case where oysters (or any other articles of irregular shape) are weighed or with a weighing tube in which live trout are weighed, the condition of identity of the inverted upstream and downstream edges forming the analogue signal of rough measurement is therefore ensured in practice. As an additional precaution, a discharge landing 35 has been provided, this landing being made of rods in the manner of those of platform 32. In this way, the speed of translation of the article is not modified by the means of transport 36 during the whole of the time which the article takes to leave the platform. It will be noted that a slight inclination of the landings 30 and 35 and of platform 32 may be provided in some cases to compensate for friction.

It will also be noted that due to the weighing platform 32 having a length always greater than the maximum length of the articles of the batch to be weighed, the step 116 shown by the signal supplied by the transducer is always present. Under these conditions, integration of this same signal is always representative of the product of the static weight of the article multiplied by its transit time on the platform.

Reference will now be made to the weighing member of FIGS. 3a and 3b. Due to the Roberval half-mechanism used, the position of the article to be weighed on the platform 32 is not involved in the production of the analogue measurement signal. In fact, with such a construction, any longitudinal displacement of the centre of gravity of the article with respect to the centre of the platform 32 is translated by the production of two identical forces of opposite directions respectively applied in tension or compression (or conversely) to the blade 92 and the beam 90 on the one hand, and to the arm 86 on the other hand. Due to the symmetrical arrangement of the pairs of gauges $R_1$-$R_3$ and $R_2$-$R_4$ on the opposite faces of blade 92, any compressive or tensile stress applied to the blade appears as identical changes in resistance of the four gauges. Under these conditions, due to the gauges being connected in a bridge, no corresponding signal is generated. The same applies when, due to lateral offset of the centre of gravity of the article on the platform, a torsion is applied to the deflection blade.

When, on the contrary, the blade 92 bends under the weight of the article being weighed, the gauges $R_1$ and $R_3$ adhesively secured to its upper face, are elongated and the gauges $R_2$ and $R_4$ secured to its lower face contract, such that there appears in the bridge diagonal a double differential signal representative of the instantaneously applied weight. In short, the measuring signal is proportional to the expression $K = \Delta R_1 + \Delta R_3 - \Delta R_2 - \Delta R_4$. In bending, the terms $(\Delta R_1 + \Delta R_3)$ and $(\Delta R_2 + \Delta R_4)$ are equal but opposite in sign and $K = 4\Delta R$. In compression and tension, all the terms are equal and $K = 0$. In torsion, $\Delta R_1 = -\Delta R_3$ and $\Delta R_2 = -\Delta R_4$, so that in this case also, $K = 0$. By suitable offsetting of the balance of the bridge by means of an adjusting potentiometer (not shown), it is easy to compensate the weight of all the suspended elements and thus to abolish the output signal in the absence of any article to be weighed.

To ensure rapid weighings (more than 10 per second), the pair of strips 84 – 86 installed, in the absence of any damping, ought to have a relatively high resonance frequency (above 60 c/s). Damping or braking by eddy currents is then advantageously used (copper plate in a magnet air-gap), which obviates any dry friction, and enables the gauge bridge integral with the equipment thus formed to translate faithfully any stressing having a frequency spectrum below about 60c/s. For lower frequencies, the air dashpot shown in quite auitable. With regard to the stiffness (and the elastic limit) of the deflection blade 92, it will be determined as a function of the length of the arms of the transducer and the maximum weight exerted by an article. It will be possible to obtain a given theoretical stiffness for an available blade thickness by progressive transformation of a rectangular or square blade into a more and more pointed isosceles trapezoidal blade.

As a modification, particularly in the case of relatively heavy articles (several kilograms) or in the case where, due to the relatively large amplitude of the bending imposed on the blade 92, the curve of displacement of the hinge 85 can no longer be assimilated to the arc of a circle, the lower arm 86 may be mechanically identical with the upper arm 84 of the transducer. In this case, the stiffness of each of the deflection blades will be half as much as in the case where a single blade is used, but only one of the blades will comprise strain gauges.

The measuring signal generated by the gauge bridge 99, after amplification in 126, is applied to the integrator circuit 128. Referring to FIG. 5, it will be seen that the integration of such an instantaneous signal produces a signal proportional to the product of the static weight P (step 116) of the article and the transit time $T = t_4 - t_0$; the hatched areas in FIG. 5 are in fact identical, once the identity of the ascending and descending slopes is ensured. The transit time T is equal to the quotient of the length of the platform divided by the speed V of movement of the article: $T = L/V$. It was seen in the foregoing that all precautions had been taken (horizontal platform with minimum friction) for the speed of travel V of a given article to be as constant as possible during its entire passage along the platform, although in practice such constancy cannot strictly be achieved. However, due to the special arrangement of the entry and exit detectors, it is possible to compensate for slight variations of V during passage along the platform. In fact, since the length of the platform for a batch of articles to be weighed (ratio of extreme lengths about 1,5) is larger than the length of the longest article of the batch, it is clear that the exit detector 44, located slightly beyond the central part of the discharge landing 35, generates a pulse almost at the moment the article has finished leaving the weighing platform. Under these conditions, the duration of the pulse supplied by the bistable trigger circuit 150 successively triggered and then stopped by the pulses supplied by the entry and exit detectors 43 and 44 at a fixed distance apart $L_o$ almost equal to 1.6 L is inversely proportional to the mean speed $V_m$ of passage of the article during the entire duration $(t_7 - t_o)$ of travel over the platform. The result is that the amplitude of the signal generated by the integrator 138 at the end of the interval determined by the detectors 43–44 is equal to $K_1 \cdot E \cdot P \cdot L/V_m$, the term $K_1$ being an integration constant and the term E being the supply voltage of the gauge bridge. Similarly, the signal appearing at the output of the integrator 128 is to the second order of accuracy $K_2 E \cdot P \cdot L/V_m$, the term $K_2$ being a constant dependent on the tiffness of blade 92, the length of arms 84 and 86, and sensitivity of the gauges used, the amplifier 126 and the integration constant of the integrator 128. Under these conditions, the discharge time T of integrator 128 is proportional to the quotient of the two above-mentioned terms, i.e. $T_P = K_3 \cdot P$, the term $K_3$ being a constant. This time is materialised by the measuring trigger circuit 154 returned to the passive state by the action of the pulse supplied by the amplitude comparator 136 detecting the instant at which the output voltage of integrator 128 returns to zero.

By suitable choice of the valve of resistor 160 determining the discharge current of integrator 128, matters are so arranged that for an article of small weight, the instant at which integrator 128 is completely discharged is later than the instant $t_7$ at which the article finishes leaving the weighing platform; it follows therefrom that the quotient anticipated is always correctly effected and the duration of the pulse supplied by trigger circuit 154 always represents the static weight of the article which has just travelled along the platform.

It will furthermore be seen that integration in time of the parasitic signals 117 and 118 (see FIG. 5), then their division by the transit time $L_0/V_m$ is expressed by a relatively small error. It is known in fact that such parasitic signals are necessarily very short compared with the transit time, and in addition their amplitude is small compared with the instantaneous amplitude of the signal supplied by the gauges under the action of the instantaneous force exerted by the article on the transducer platform.

At the same time as the measuring trigger circuit 154, the monostable circuits 164, 168 and 172 are triggered by the end-of-discharge pulse of integrator 128 generated by comparator 136. Their respective durations of operation $T_1$, $T_2$ and $T_3$ are fixed by the position of adjusting knobs 166, 170 and 174. These durations are a function of the three thresholds $P_1$, $P_2$ and $P_3$, determining the four categories of weights in which an article of weight P may fall:

Category A if $P \leq P_1$
category B if $P_1 < P \leq P_2$
category C if $P_2 < P \leq P_3$
category D if $P_3 \leq P$.

The direct output of the monostable circuit 164 applied to the input of the AND gate 176 at the same time as the end-of-discharge pulse supplied by comparator 136 causes a pulse A to appear at the output of AND gate 176 if $T_P \leq T_1$. Likewise, a pulse B appears at the output of AND gate 178 if $T_1 \leq T_P < T_2$ and a pulse C at the output of AND gate 180 if $T_2 < T_P \leq T_3$, and also a pulse D at the output of the AND gate 182 if $T_3 < T_P$. Each classification pulse A, B, C or D is respectively counted in one of counters 179, 181, 183 or 185. In addition, the sorting control signals X, Y and Z appear respectively at the outputs of the bistable trigger circuits 193, 187 and 189 and last until a passive state return pulse is applied to these trigger circuits by exit detector 44. At this instant, the next article arrives at the centre of the discharge landing 35. The speed of drive $V_3$ of the discharge conveyor belt 36 under these conditions is selected to be sufficiently high and the distance between the pivots 62 and 66 of flaps 60 and 64 and the upstream edge of the belt is small enough for the article just weighed and classified to be completely switched in consequence, before the system of measuring logical circuits (trigger circuit 154) or classification circuits (monostable trigger circuits and AND circuits) start a fresh processing cycle. Selection of the distance between pivots 62 and 68 and the upstream edge of belt 36 equal to the length of platform 32 (and landing 35) and the speed $V_3 = 2V_2$ ensures that sorting of an article will be definitely determined before the flaps change position.

For the oyster 65 leaving at A, the switching control orders were $X = Y = 0$ and the two flaps 56 and 60 were in their inoperative position. For oyster 67 classified in D, the switching orders are $X = Z = 1$ and the two flaps 56 and 60 are in their operative position.

Thus, as will be readily understood, at the four exits A, B, C and D of the sorter, baskets are placed, in which female workers place the oysters arriving at these exits. When one of the counters 179, 181, 183 or 185 reaches the precount fixed for it, an acoustic or luminous signal is produced, while a blocking flap (not shown) swings against the end of one of the four spouts leading the oysters from the exits of the sorter to the baskets. Under these conditions, the worker is warned that the basket receiving the oysters of category A, B, C or D is full (it carries a label on which appears the abovementioned precount and the category concerned. She then transfers it to another working station. She then places an empty basket under the spout concerned and lifting up the said blocking flap, allows the few oysters which have been sorted in this category during the preceding operation to fall into this fresh basket.

The operation of the processing system shown in FIG. 7 will now be described. As stated in the foregoing, this system is particularly well adapted to the sorting for dispatch of articles such as oysters or sausages, the problem being to collect automatically in a box a given minimum weight of products of the same weight category and to prin a label indicating for each box their exact number and total net weight.

As was seen in the foregoing, the measuring bistable trigger circuit 154 supplies a pulse of length proportional to the static weight of the article weighed at that instant. By suitable adjustment of the frequency of clock 186, the number of pulses counted by the counter 188 during the length of the measuring pulse supplies the measured weight in grams. It will be assumed that this article has been classed in category B. Under these conditions, a classification pulse B is applied for triggering, to the trigger circuit 190 at the instant when the measuring trigger circuit 154 has returned to the inoperative state. Under these conditions, the high-speed clock 194 then sends for subtraction via gates 192 and 196 to the counter-subtractor 188 a number of pulses equal to that which has just been counted. The totalling counter 198 corresponding to category B receives the same number of pulses. The same occurs each time an article is classified in this category. It is the same for similar totalling counters for categories A, C and D. At the same time, a pulse B has been counted in counter 216 allocated to the number of articles. When the reference weight (for example 2,000 grams) fixed by the inking indicator 200 has been reached in the totalling counter 198, a coincidence pulse is supplied by the comparator 202. The counter 198 continues to receive the remaining pulses of the group of pulses representative of the last article just weighed. Matters are so arranged that taking into account the frequency of the highspeed clock 194, the time required for this extra counting cannot be longer than the delay $\Delta_1$ introduced by the circuit 204. When the delay circuit 204 applies a control pulse to the transfer circuit 206, signals controlling the printing of the number contained in the counter 198 and the symbol contained in the store 208 are applied to the printer 220, which reacts immediately. The delay circuit 210 ($\Delta_2 > \Delta_1$) then generates a triggering pulse causing the transfer circuit 212 to operate and controls the printing 220 of the state of counter 216 and of the symbol contained in store 214. The delay circuit 224 ($\Delta_3 > \Delta_2$) then supplies in its turn a pulse which returns the counters 198 and 216 to zero, causes an alarm 230 to operate and swings the blocking flap 232 mounted on the exit spout or ramp for articles of category B. It is then merely necessary for the worker, who has just be warned that the category B box is full, to tear off the label 222 just printed and fix it to the box concerned.

As a modification, it is of course possible in the device described in the foregoing to omit all the circuits concerned in printing control, thereby retaining only four article counters and four weight totallers.

It will be noted that this modification is of particular interest in the case of pisciculture installations for determining, after sorting trout by weight, the number and total weight of fish discharged into a given pool, so that it will be possible to determine objectively the quality and daily amount of food necessary for such fish.

The invention is not limited to the embodiments described in the foregoing, but on the contrary is applicable with suitable modifications to all sorts of articles. In the case for example where these articles are very small (tablets) and light in weight (less than ten grams), advancement by vibrating ramps may be advantageously considered instead of by the conveyor belt described in the foregoing. In this case also, the deflection blade with gauges secured thereto will be replaced by a more sensitive element having a lower threshold, for example a silicon deflection blade a few hundredths of a millimetre thick, in which piezo-resistance gauges have been diffused. With silicon deflection blades comprising different gauges, and taking into account the fact that the silicon used is a single crystal in which the stresses are tensile stresses, it is possible to use, as component usable in a weight transducer according to the invention, a deflection transducer which is insensitive to compression, elongation or torsion and in which all the piezoresistive gauges are diffused in a single face of the blade. This, of course, considerably reduces the manufacturing costs of such a transducer. In this case also, since the rate of weighing and sorting may attain 30 or 40 per second or even more, the switching flaps could be replaced by suitably directed compressed air jets controlled by electrically operated valves.

One modification of the invention concerns the use of the device according to the invention for the dynamic weighing of articles of considerable weight, moving on one or more rails (quarters of meat, trucks, etc.). In this case, the alignment and separation device according to the invention is useless and the weight transducer described is unsuitable, but any dynamometer element (ring, small column) adapted to the weight of the loads and provided with strain gauges will then permit the complete embodiment of the dynamic weighing device according to the invention, which is not limited to the use of any particular alignment device and weight transducer.

As modification of the devices of FIGS. 6 and 7, it will be noted that for some special applications, it may be unnecessary to classify the articles according to their weight, but on the other hand it is then necessary to print this weight on a label to be fixed to the said article (cut-up cheese, portions of meat, killed pullets, etc.), the cost per kilogram and the price of the article being generally added to the weight indication. Such a modification may be readily derived from FIG. 7.

Also by way of modification, it will be noted that although the embodiment of the dynamic weighing device described is adapted to deal with analogue signals, the device of the invention may be based on digital signals by making use, for example, of voltage to frequency conversion techniques, followed by integration and digital division techniques familiar to any person versed in the art.

I claim:

1. Dynamic weighing apparatus for articles of comparable weight and bulk, comprising weight transducer means having a pass-band adapted to the desired rate of measurement and a range of measurement adapted to the weight of the said articles, a weighing platform, in said weight transducer means, the dimension in the direction of advance of the articles of said platform being at least equal to the maximum dimension of the articles in the said direction, handling means for causing the said articles to advance in translation on the said platform, separated from one another by a minimum distance, equal to the said dimension of the platform, integration means for integrating the signal derived linearly from the signal supplied by the said transducer means during the entire duration of the passage of the article on the said platform, means for generating a transit-time correction signal inversely proportional to the mean speed of the crossing of the platform by the said article, and means for dividing the integrated signal by the said correction signal for generating an elaborated measuring signal representing the static weight of the article.

2. A weight transducer comprising:

a weighing platform, a vertical connecting rod integral with said platform, support means, two parallel rigid arms of equal length arranged horizontally one above the other and each having one end thereof hinged to said rod, respective connecting means connecting the other ends of said arms to said support means, deflection blade means forming at least one of said connecting means and at least part of the arm integral therewith, said blade means being fixed in said support means, the stiffness of the blade means being selected as a function of the maximum bending moment exerted on it by the articles to be weighed, converting means for producing an electrical signal representative of the verticle displacements of said platform, and a vibration damping means provided and designed such that the pass-band the said transducer, with an article present on the platform, ensures the desired rate and accuracy of the measurements.

3. A transducer as claimed in claim 2 wherein said converting means includes a plurality of strain gauges arranged in said blade means and connected to form a Wheatstone bridge in such a manner that a measuring signal supplied by said bridge through the action of an article crossing the platform is substantially independent of any parasitic tensile, compressive or torsional stresses applied to the said blade means.

4. A transducer as claimed in claim 3, more particularly intended for weighing articles of a weight greater than about 10 grams and less than about 10 kilograms, in which the deflection blade means is in the form of an isosceles trapezoid, the axis of symmetry of the said blade means coinciding with the axis of the arm of the transducer integral with it, the pair of strain gauges belonging to two opposite arms of the Wheatstone bridge being adhesively secured to the same face of the blade, symmetrically with respect to its axis, the two pairs of gauges facing one another on either side of the blade and being arranged in close proximity to the fixing line of the blade.

5. A transducer as claimed in claim 3, more particularly adapted for articles of a weight of less than about 10 grams and for very rapid rates of measurement, in which the deflection blade means is a silicon single crystal, on one of the faces of which at least 4 strain gauges have been diffused.

6. A transducer as claimed in claim 2, in which the weighing platform comprises, at least as constituent elements, means for guiding in translation and having a low coefficient of friction, adapted to the nature of the articles to be weighed, guiding means similar to the preceding means being provided in addition upstream and downstream of the said platform.

7. A transducer as claimed in claim 6, in which the articles to be weighed are inert, the weighing platform is formed of parallel bars arranged along the direction of advance of the articles.

8. A transducer as claimed in claim 6, in which the articles to be weighed being live animals, the weighing platform is a tube of closed section corresponding to the maximum section of the said animals.

9. Dynamic weighing apparatus as claimed in claim 1, in which the said handling means are provided for articles of the same nature received in disorder and comprising:

at least two means of transport adapted to the nature of the said articles and arranged in sequence of one another, the rate of advance of the downstream means of transport being several times higher than the speed of the upstream means of transport, guide means associated at least with the upstream means of transport constituting a gradually narrowing passage, the minimum width of which is determined by a particular dimension of the articles to be caused to advance.

10. Dynamic weighing apparatus as claimed in claim 9, in which the articles to be weighed being inert, the transport means are belts and the guide means are obliquely fixed walls arranged opposite one another above the upstream belt.

11. Dynamic weighing apparatus as claimed in claim 9, in which the articles to be weighed being live fish or crustaceans, the means of transport are streams of water and the guide means are pipes of sections and lengths adapted to the homologous dimensions of the said fish or crustaceans, the inlet aperture of the upstream pipe being appreciably larger than that of the outlet.

12. Dynamic weighing apparatus as claimed in claim 1, in which:

the weight transducer means comprises converting means for producing an electrical signal representative of the vertical displacements of said weighing platform, said converting means being supplied off a voltage source, the signal supplied by said converting means being permanently applied to the input of a first integrator circuit of analogue type, a signal derived from the said voltage source is applied to the input of a second integrator, also of analogous type, during a transit-time interval for generating the said transit-time correction signal, the commencement and end of the said time interval being determined respectively by the instants of arrival of the article in front of a first presence detector arranged in close proximity to the platform entry, and in front of a second presence detector arranged after the platform exit at a distance from the said exit approximately equal to the average dimension of the articles in the direction of their advance, means are provided for applying at the end of the said time interval the said transit-time correction signal to the input of the first integrator circuit for discharging the latter at a rate of discharge proportional to the said correction signal, measuring means are provided which receive a triggering pulse at the nstant of application of the said correction signal to the input of the first integrator circuit, then in blocking a weight detection pulse generated by a comparator circuit at the instant at which it detects that the amplitude of the output signal of the said first integrator circuit returns to a predetermined inoperative level, the said measuring means being adapted to generate analogy and/or digital signals respective of the static weight of the articles.

13. A classification device for articles as a function of N weight categories, intended to be associated with a dynamic weighing device according to claim 12 and comprising:

a number (N−1) of monostable circuits whose durations of operation, adjustable as a function of the upper threshold of the (N−1) categoreis of lower weight, increase as a function of their rank, the said monostable circuits being all triggered in parallel by the said triggering pulse, a number N of logical AND circuits all receiving in parallel at their input the weight detection pulse generated by the said comparator, the direct output signal of each monostable circuit being applied to the input of the logical AND circuit of the same rank as it, the reverse output signal of each monostable circuit being applied to the input of the logical AND circuit of immediately higher rank, the pulses appearing at the output of the said N logical AND circuits are weight classification pulses respectively characteristic of the said N weight catagories, more particularly adapted to be respectively applied in counting to N pulse counters for supplying the respective numbers of articles falling into each of the said N categories.

14. A device for sorting articles into four categories and intended to be associated with a dynamic weighing device according to claim 1 comprising downstream of the weighing platform:

a means of transport adapted to the nature of the said articles advancing at a speed at least equal to and preferably appreciably higher than the exit speed of the articles from the said platform, a first switching device adapted for carrying an article along by the said means of transport towards a first or a second pair of discharge passages as a function of a binary sorting signal X, a second and third switching device arranged downstream of the first switching device at the heat respectively of the said two pairs of passages, the second and third switching devices being respectively adapted, as a function of binary sorting signals Y and Z, to cause an article to be carried along by the said means of transport towards the first and second discharge passages of each of the said pairs of passages.

15. A device for sorting articles according to claim 14, in which the said transport means is a belt when the article is inert, and a stream of water when the article is a live fish.

16. A control device for sorting articles into four weight categories intended to be associated with a classification device according to claim 12 and to generate the three binary signals X, Y and Z necessary for the operation of the sorting device, comprising three bistable circuits elaborating respectively the said signals X, Y and Z, the terminals for putting into the active state the bistable circuits supplying the signals X and Z and receiving respectively the weight classification pulses supplied by the logical AND circuits of rank 2 and 4, the terminals for putting into the active state the bistable circuit supplying the signal X and receiving the output pulses of a logical OR gate, to the input of which are applied the weight classification pulses supplied by the AND circuits of rank 3 and 4, the terminals for returning to the passive state the three bistable circuits receiving in parallel a pulse derived from the signal generated by the presence detector arranged at the exit of the transducer platform.

17. A device for totalling by category the weights of articles respectively classified in N categories, intended to be associated at one and the same time with a dynamic weighing device according to claim 12, supplying a digital output signal and with an article classification device according to, comprising N transfer elements rendered respectively operative by the N weight classification pulses operating in such a manner that the digital signal supplied by the said dynamic weighing device is returned to zero after having been transferred and counted in the totalling counter selected by a given weight classification pulse.

* * * * *